(12) United States Patent
Anderson et al.

(10) Patent No.: US 8,751,620 B2
(45) Date of Patent: Jun. 10, 2014

(54) VALIDATING DEPLOYMENT PATTERNS IN A NETWORKED COMPUTING ENVIRONMENT

(75) Inventors: Jason L. Anderson, San Jose, CA (US);
Gregory J. Boss, Saginaw, MI (US);
Jeffrey L. Coveyduc, San Jose, CA (US); Shaun T. Murakami, San Jose, CA (US); John Reif, Redwood City, CA (US); Animesh Singh, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 13/435,098

(22) Filed: Mar. 30, 2012

(65) Prior Publication Data

US 2013/0262643 A1 Oct. 3, 2013

(51) Int. Cl.
*G06F 15/16* (2006.01)
*G06F 12/00* (2006.01)

(52) U.S. Cl.
USPC .......................................... 709/223; 709/250

(58) Field of Classification Search
CPC ....... G06Q 10/06; G06Q 50/06; H02J 13/001; H02J 13/0062; H02J 13/0079; H02J 13/0086; H02J 3/14; H02J 3/16; H02J 3/382; H02J 2003/007; H02J 41/145; H02J 9/083; Y02B 70/3225; Y02B 90/2638
USPC .................................. 709/203, 223–229, 250
See application file for complete search history.

(56) References Cited

U.S. PATENT DOCUMENTS

| | | | |
|---|---|---|---|
| 8,069,242 B2 | 11/2011 | Hadar et al. | |
| 8,321,547 B2 * | 11/2012 | Anand et al. | 709/223 |
| 8,621,552 B1 * | 12/2013 | Lotem et al. | 726/1 |
| 2007/0244897 A1 * | 10/2007 | Voskuil et al. | 707/9 |
| 2008/0271110 A1 | 10/2008 | Graves et al. | |
| 2009/0006152 A1 * | 1/2009 | Timmerman et al. | 705/7 |
| 2010/0125664 A1 | 5/2010 | Hadar et al. | |
| 2011/0126197 A1 | 5/2011 | Larsen et al. | |
| 2011/0209064 A1 | 8/2011 | Jorgensen et al. | |
| 2011/0231822 A1 | 9/2011 | Sabin et al. | |
| 2012/0029897 A1 * | 2/2012 | Cherian et al. | 703/18 |
| 2012/0066670 A1 | 3/2012 | McCarthy et al. | |
| 2012/0185913 A1 * | 7/2012 | Martinez et al. | 726/1 |

OTHER PUBLICATIONS

Maitland, J., "Keeping Control Isn't Easy", Chapter 4: Cloud-Based Infrastructure, SearchCloudComputing.com, 13 pages.
Mell et al., "The NIST Definition of Cloud Computing", National Institute of Standards and Technology, Information Technology Laboratory, Version 15, Oct. 7, 2009, 2 pages.
Golden, B., "When Data Compliance and Cloud Computing Collide", itworld.com, Sep. 10, 2010, 8 pages.

* cited by examiner

*Primary Examiner* — Zarni Maung
(74) *Attorney, Agent, or Firm* — William E. Schiesser; Keohane & D Alessandro, PLLC

(57) ABSTRACT

Embodiments of the present invention provide an approach for validating deployment patterns/topologies (e.g., prior to being deployed) against existing patterns that have already been determined to be compliant (e.g., against a set of policies/standards). In a typical embodiment, individual components of a proposed deployment pattern are identified and then evaluated against previously approved deployment patterns (e.g., based on standards and/or policies). Components of the proposed deployment patterns that are deemed non-compliant are identified, and corrective action(s) may be determined to address any non-compliance (e.g., to put the non-compliant components into compliance, to remove the non-compliant components, etc.).

22 Claims, 9 Drawing Sheets

VALIDATING DEPLOYMENT PATTERNS IN A NETWORKED COMPUTING ENVIRONMENT

TECHNICAL FIELD

In general, embodiments of the present invention relate to deployment patterns (e.g., network topologies, workload types, etc.). Specifically, embodiments of the present invention relate to the validation of deployment patterns in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Cloud consumers are provided with the capability to develop and deploy complex patterns, topologies, and architectures. Challenges may exist, however, in determining whether developed deployment patterns are compliant with applicable policies and/or standards.

SUMMARY

In general, embodiments of the present invention provide an approach for validating deployment patterns/topologies (e.g., prior to being deployed) against existing patterns that have already been determined to be compliant (e.g., against a set of policies/standards). In a typical embodiment, individual components of a proposed deployment pattern are identified and then evaluated against previously approved deployment patterns (e.g., based on standards and/or policies). Components of the proposed deployment patterns that are deemed non-compliant are identified, and corrective action(s) may be determined to address any non-compliance (e.g., to put the non-compliant components into compliance, to remove the non-compliant components, etc.).

A first aspect of the present invention provides a computer-implemented method for validating deployment patterns in a networked computing environment, comprising: identifying a set of proposed components of a proposed deployment pattern for the networked computing environment; comparing the set of proposed components to existing components of existing deployment patterns to identify a set of existing components that are similar to the set of proposed components; evaluating the set of proposed components for compliance with a set of policies, the set of policies being stored in at least one computer storage device; and determining, responsive to at least one component of the set of proposed components lacking compliance with at least one policy of the set of policies, at least one corrective action to address the lack of compliance.

A second aspect of the present invention provides a system for validating deployment patterns in a networked computing environment, comprising: a memory medium comprising instructions; a bus coupled to the memory medium; and a processor coupled to the bus that when executing the instructions causes the system to: identify a set of proposed components of a proposed deployment pattern for the networked computing environment; compare the set of proposed components to existing components of existing deployment patterns to identify a set of existing components that are similar to the set of proposed components; evaluate the set of proposed components for compliance with a set of policies, the set of policies being stored in at least one computer storage device; and determine, responsive to at least one component of the set of proposed components lacking compliance with at least one policy of the set of policies, at least one corrective action to address the lack of compliance.

A third aspect of the present invention provides a computer program product for validating deployment patterns in a networked computing environment, the computer program product comprising a computer readable storage media, and program instructions stored on the computer readable storage media, to: identify a set of proposed components of a proposed deployment pattern for the networked computing environment; compare the set of proposed components to existing components of existing deployment patterns to identify a set of existing components that are similar to the set of proposed components; evaluate the set of proposed components for compliance with a set of policies, the set of policies being stored in at least one computer storage device; and determine, responsive to at least one component of the set of proposed components lacking compliance with at least one policy of the set of policies, at least one corrective action to address the lack of compliance.

A fourth aspect of the present invention provides a method for deploying a system for validating deployment patterns in a networked computing environment, comprising: providing a computer infrastructure being operable to: identify a set of proposed components of a proposed deployment pattern for the networked computing environment; compare the set of proposed components to existing components of existing deployment patterns to identify a set of existing components that are similar to the set of proposed components; evaluate the set of proposed components for compliance with a set of policies, the set of policies being stored in at least one computer storage device; and determine, responsive to at least one component of the set of proposed components lacking compliance with at least one policy of the set of policies, at least one corrective action to address the lack of compliance.

BRIEF DESCRIPTION OF THE DRAWINGS

These and other features of this invention will be more readily understood from the following detailed description of the various aspects of the invention taken in conjunction with the accompanying drawings in which.

Figure 1:
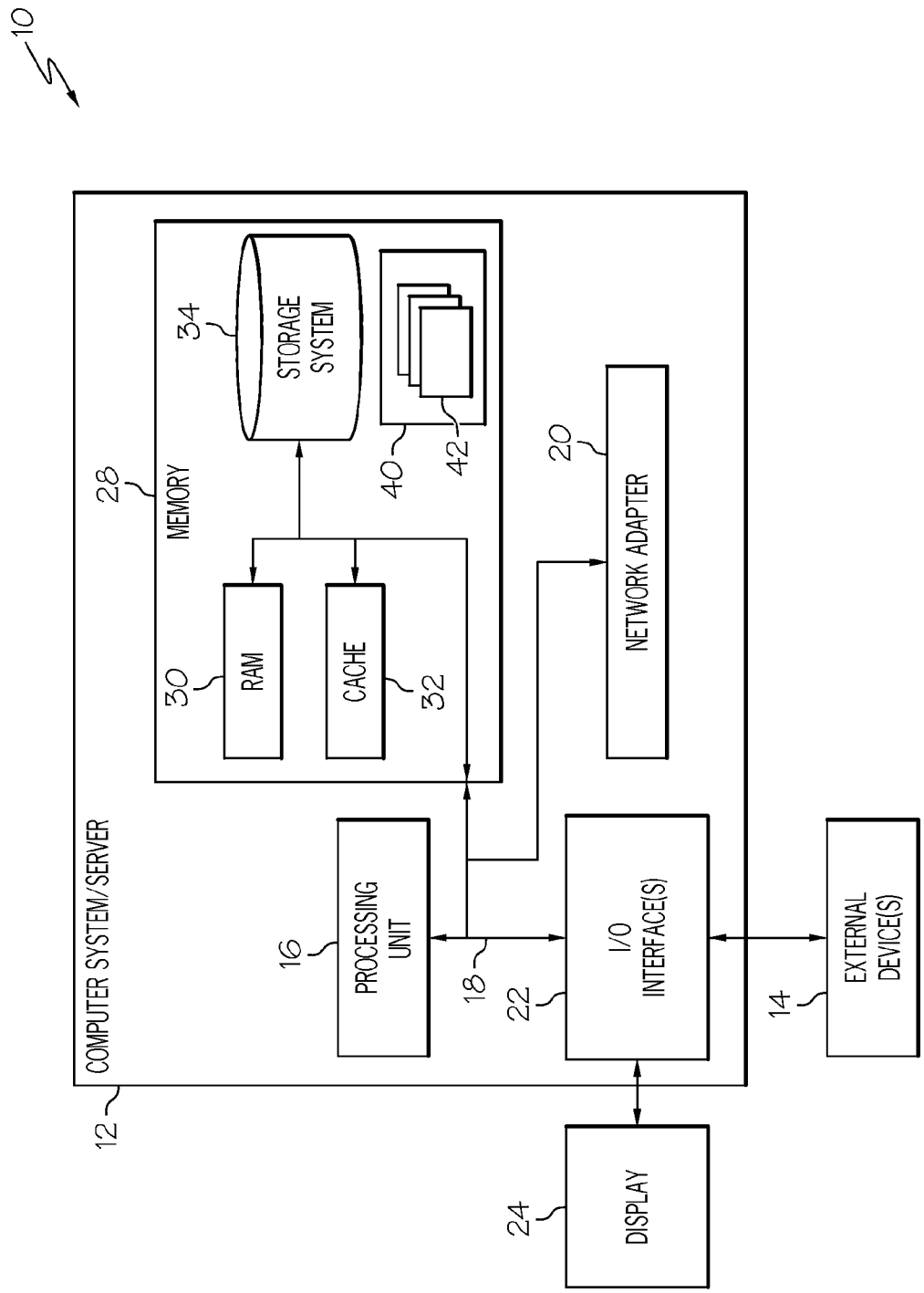
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for validating deployment patterns/topologies (e.g., prior to being deployed) against existing patterns that have already been determined to be compliant (e.g., against a set of policies/standards). In a typical embodiment, individual components of a proposed deployment pattern are identified and then evaluated against previously approved deployment patterns (e.g., based on standards and/or policies). Components of the proposed deployment patterns that are deemed non-compliant are identified, and corrective action(s) may be determined to address any non-compliance (e.g., to put the non-compliant components into compliance, to remove the non-compliant components, etc.).

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
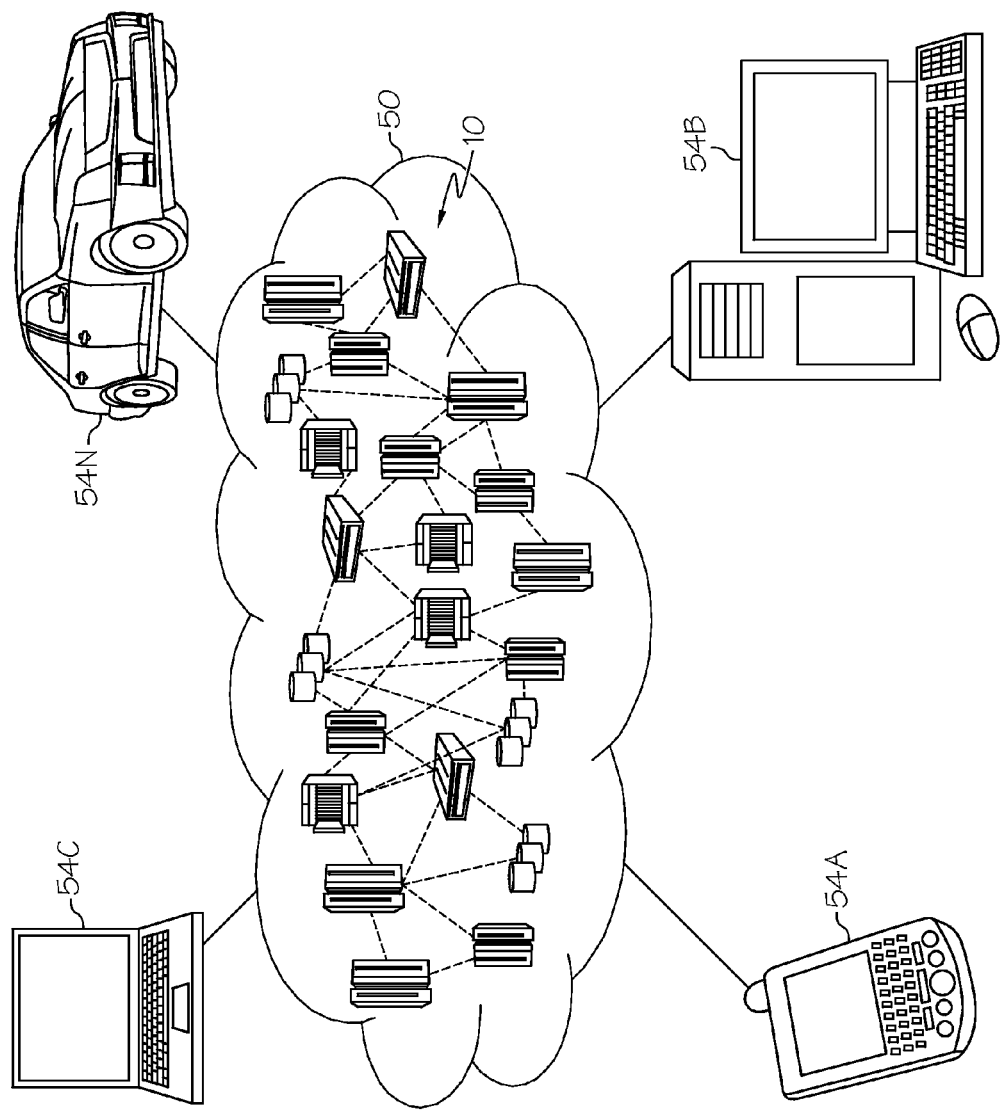
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
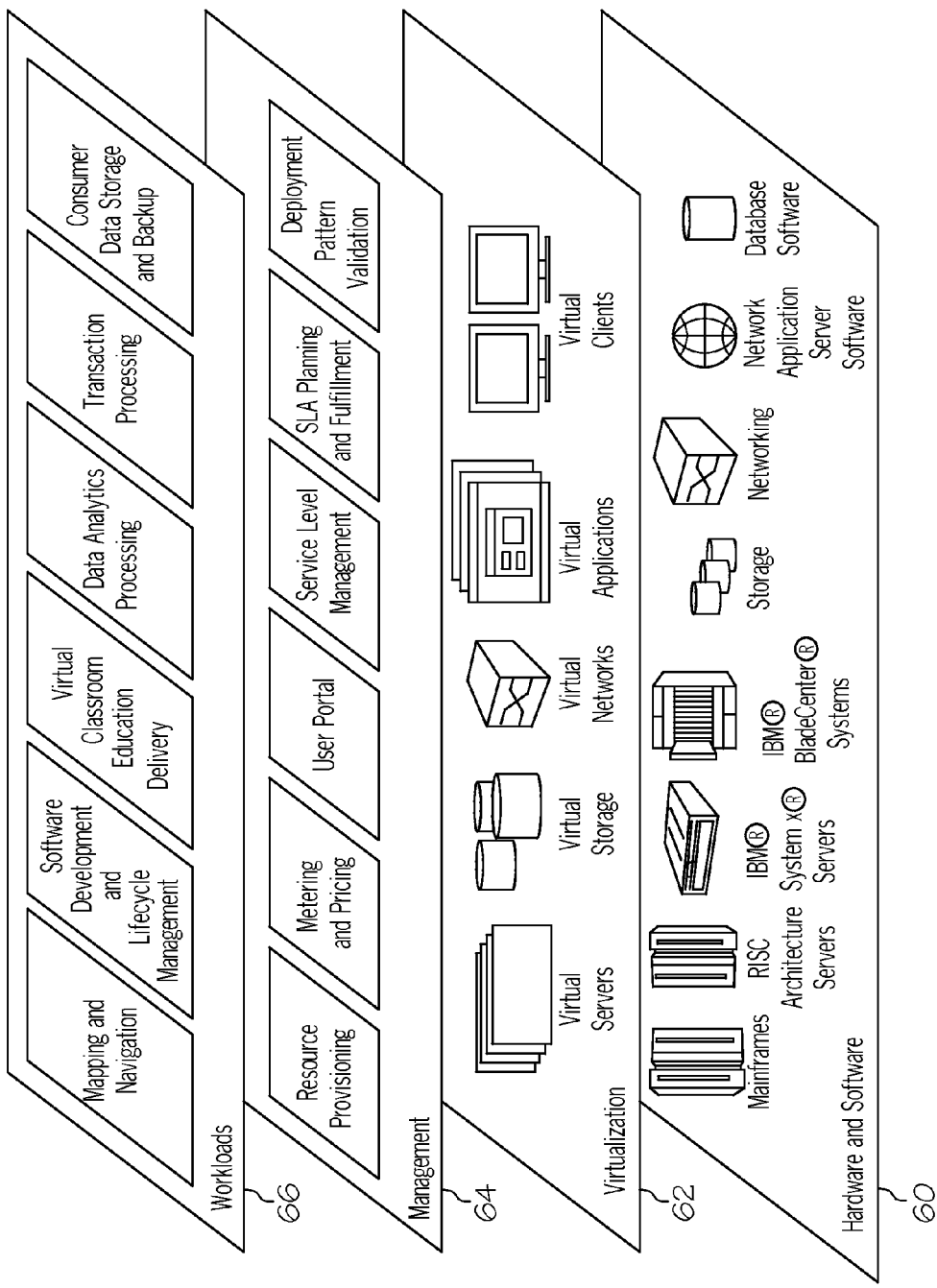
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is deployment pattern validation, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the deployment pattern validation functionality of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

As indicated above, embodiments of the invention provide a system for validation of a cloud deployment pattern or topology. Along these lines, examples of deployment patterns against which the system described herein may validate include one or more the following (among others):

1. Security—deviations against corporate/organization standards (e.g., a proxy/firewall hole).
2. Risk assessment—analyze pattern/topology for probability of risks defined in policies (e.g., the probability of data loss, security posture, etc.).
3. Compliance standards—corporate or industry standards and regulations (e.g., healthcare regulations, etc.).
4. Performance—find potential bottlenecks in the system down to the node or node characteristics (e.g., low memory, his processing consumption, etc.).
5. Topology/pattern Assessment—compare a topology/pattern to best practice templates or methodologies (e.g., to identify service-oriented architecture (SOA) patterns, etc.).

As further indicated above, if a non-compliant pattern component has been identified, the system may take one or more corrective actions (e.g., make a configuration change, an exception process, etc.).

Figure 4:
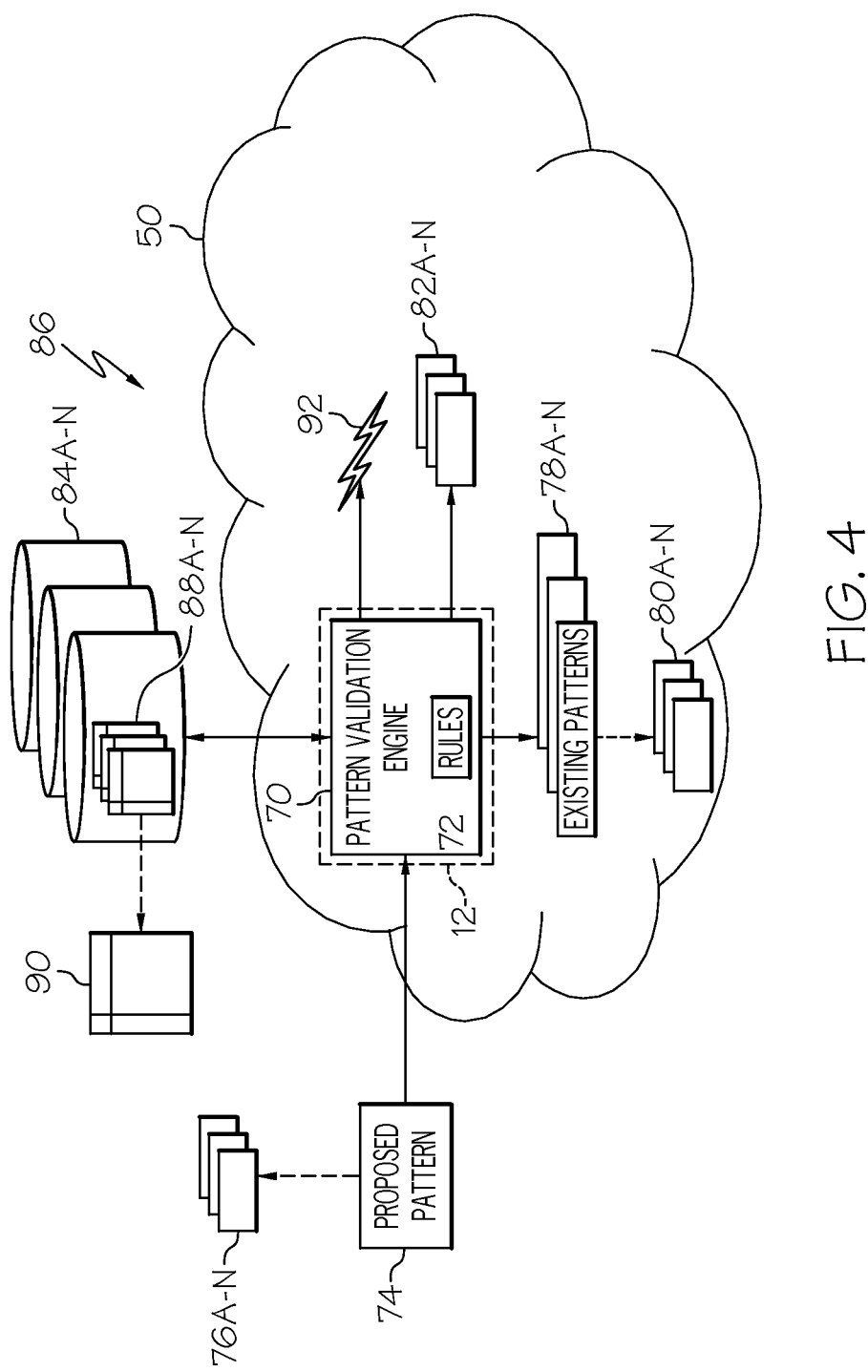
FIG. 4 depicts an illustrative system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A stand-alone computer system/server 12 is shown in FIG. 4 for illustrative purposes only. In the event the teachings recited herein are practiced in a networked computing environment 86, each client need not have a deployment pattern validation engine (engine 70). Rather, engine 70 could be loaded on a server or server-capable device that communicates (e.g., wirelessly) with the clients to deployment pattern validation therefor. Regardless, as depicted, engine 70 is shown within computer system/server 12. In general, engine 70 can be implemented as program/utility 40 on computer system 12 of FIG. 1 (e.g., in memory 28) and can enable the functions recited herein. As further shown, engine 70 (in one embodiment) comprises a rules and/or computational engine that processes a set (at least one) of rules/logic 72 and/or provides deployment pattern validation hereunder.

Along these lines, engine 70 may perform multiple functions similar to a general-purpose computer. Specifically, among other functions, engine 70 may (among other things): receive a proposed deployment pattern 74; analyze the proposed deployment pattern 74 to identify a set of proposed components 76A-N; compare the set of proposed components 76A-N to existing components 80A-N of existing deployment patterns 78A-N to identify a set of existing components 82A-N (e.g., previously determined to be compliant with a set of corresponding policies) that are similar to the set of proposed components 76A-N; evaluate the set of proposed components 76A-N for compliance with a set of policies 88A-N (e.g., stored in at least one computer storage device 84A-N (e.g., comprising at least one of the following: component attributes, policy attributes, or interrelationship attributes); and/or determine, responsive to at least one of the set of proposed components 76A-N lacking compliance with at least one 90 of the set of policies 88A-N, at least one corrective action 92 to address the lack of compliance.

Figure 5:
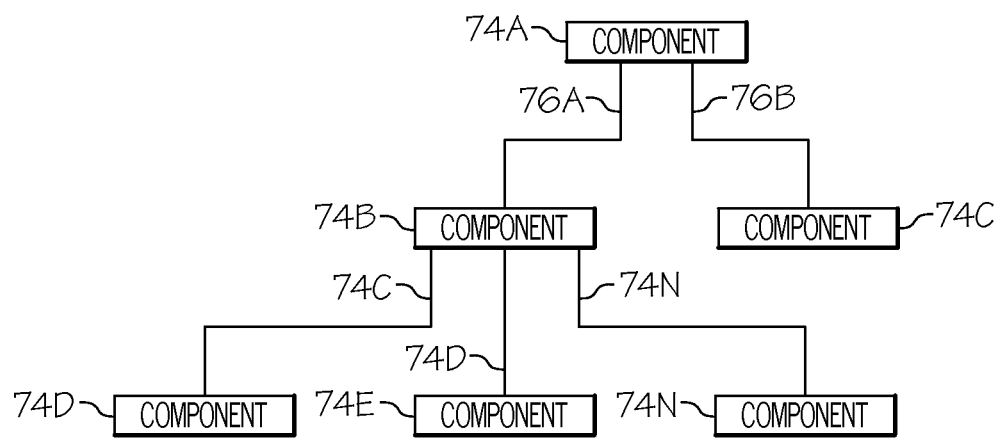
FIG. 5 depicts illustrative examples of component attributes according to an embodiment of the present invention.

It should be understood that components 76A-N and/or 80A-N may have various interrelationships with one another. Along these lines, engine 70 may identify these interrelationships to identify other components. An example of this is shown in FIG. 5. As depicted, components 74A-N could be interrelated in a hierarchical or other format. Engine 70 could begin at any component such as component 74A, and traverse each interrelationship 76A-N.

Illustrative Use Case

In order to provide a detailed example illustration the functionality of embodiments of the present invention:
1. A user defines a pattern/topology of one or more nodes (e.g., virtual machines (VMs), network appliances, or services, etc.) to be deployed in a cloud environment.
2. The system/engine 70 analyzes and validates the pattern/topology.
   A. Based on the pattern/topology/workload type submitted, the system determines what sets of policies/rules with which to evaluate/interrogate the pattern.
   B. In the event of non-compliance or the elevation of partial non-compliance above a predetermined threshold . . . .
      1. The system may require the user to make modifications (or provide suggestions) to the submitted pattern/topology.
      2. The system may automatically include supporting configurations or adding nodes to the pattern/topology to help the user comply with the enforced policy(ies).
3. After all the warnings/errors are addressed, the system continues with the deployment and implements the pattern/topology.

Shown below is illustrative computer program code according to an embodiment of the present invention for identifying components of a deployment pattern.

Method Steps:
1. For i=1 to n:
1. Identify the Proposed_Component (i);
2. Identify the interrelationships connected Proposed_Component(i);
3. Identify the components connected to the interrelationships in step 1.2;
4. i=i+1.

Once the base components along with all of their directly connected components have been identified, the system will take each of those components or component groups and search a catalog or the like for similar components that are already approved (e.g., deemed compliant with any applicable policies/standards). For example, a component may exist that is a web application server with no interrelationships or directly connected components. The component, in isolation, can then be an input to the method below for comparison, and the component group would then comprise a single component.

There may, however, also be a web application server that is connected to a database as well as a lightweight directory access protocol (LDAP) server used for authentication. In this case, the component group may comprise three components (Web server, database, and LDAP server) and two interrelationships (Web App <--> DB, and Web App <--> LDAP).

Shown below is illustrative computer program illustrating the evaluation of a rule for all components:
For each rule r do:
For each component c:
r.validate(c).

Shown below is illustrative computer program illustrating the evaluation of a component for a given rule:
r.validate(component):
For each link I do:
r.validate(component, link);
For each connectedComponent connected to a component do:
r.validate(component, link, connectedComponent).

As indicated above, proposed components (e.g., parts of a deployment pattern) may be evaluated against policies (e.g., company policies). In this example, the term "company policies" is used generically and may include: component attributes, policy attributes, and/or interrelationship attributes (e.g., as used in a PaaS platform.

Figure 6:
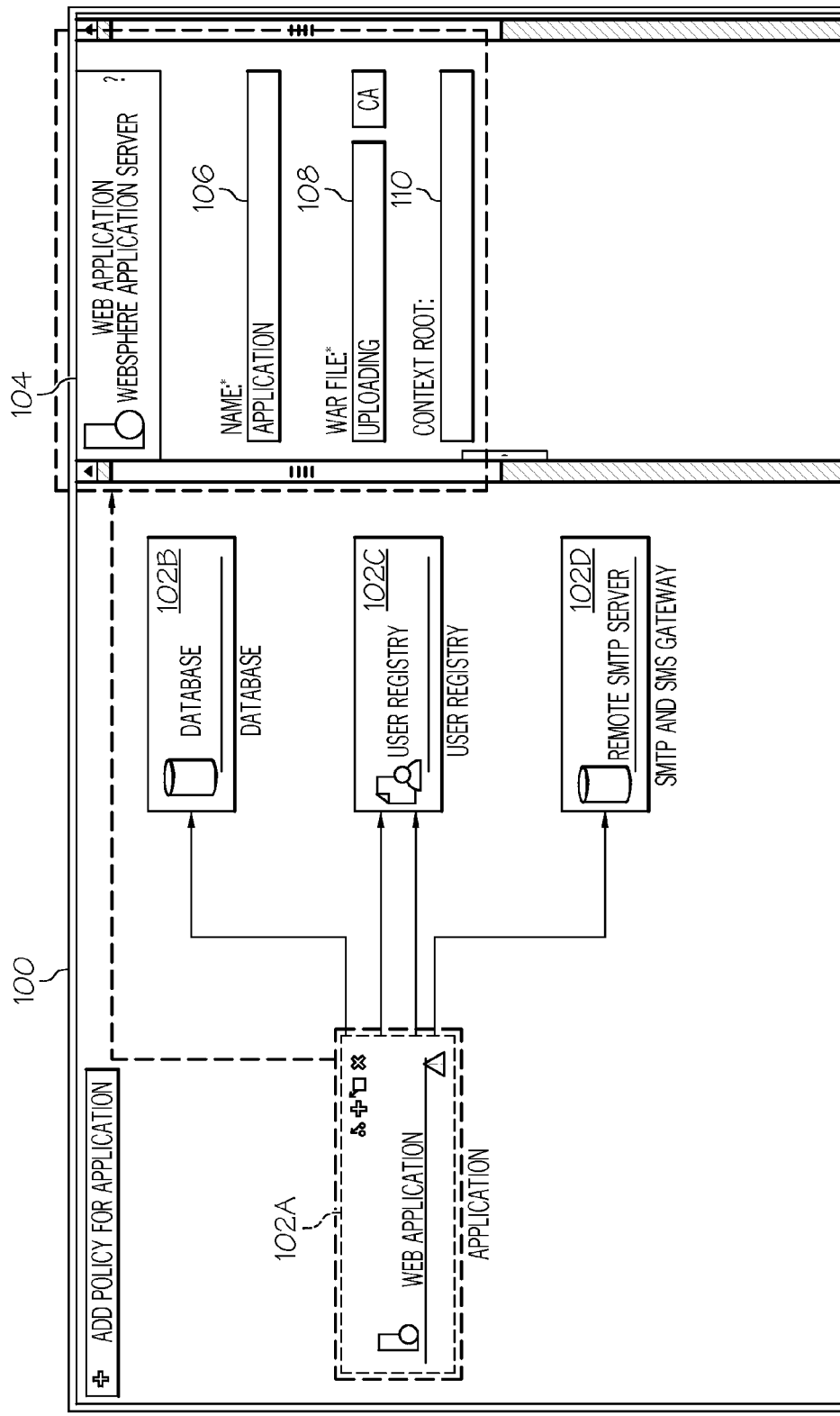
FIG. 6 depicts illustrative examples of interrelationships between components according to an embodiment of the present invention.

Referring now to FIG. 6, an interface 100 that graphically depicts component attributes is shown. As depicted, interface 100 graphically depicts components 102A-D. Interface 100 further provides a window 104 or the like that can display various attributes of a selected component. In this illustrative example, component 102A has been selected. As a result, attributes window 104 displays various attributes of component 102A such as name 106, web application archive (WAR) file 108, context root 110, etc.

Figure 7:
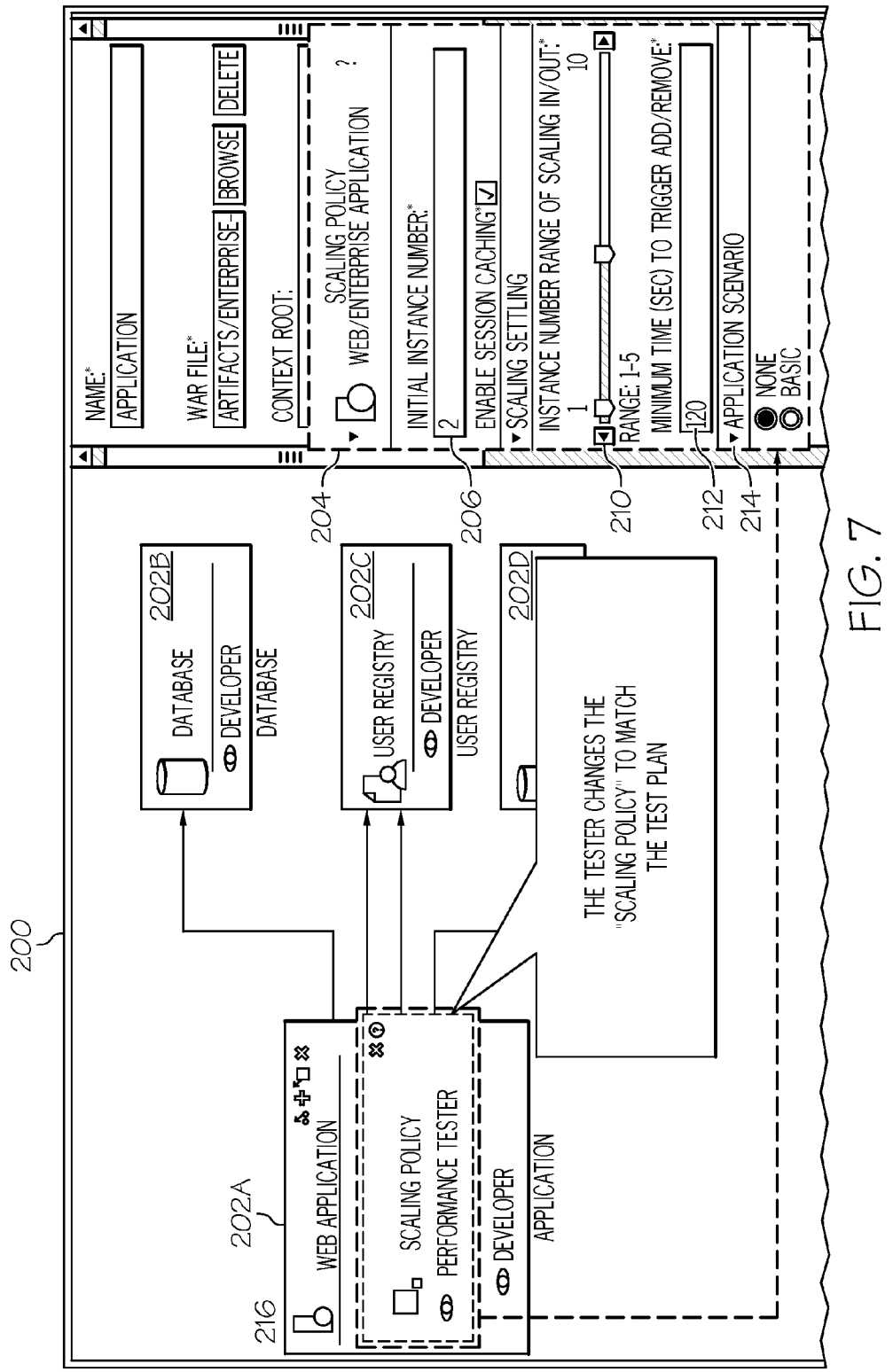
FIG. 7 depicts illustrative examples of a policy attribute according to an embodiment of the present invention.

Referring now to FIG. 7, an interface 200 that graphically depicts policy attributes is shown. As depicted, interface 200 graphically depicts components 202A-D. Interface 200 further provides a window 204 or the like that can display various attributes of a selected policy. In this illustrative example, policy 216 of component 202-A has been selected. As a result, attributes window 204 displays various attributes of policy 216 such as instance number 206, scaling setting 208, instance number range of scaling 210, minimum time to trigger and add or remove operation 212, application scenario 214, etc.

Figure 8:
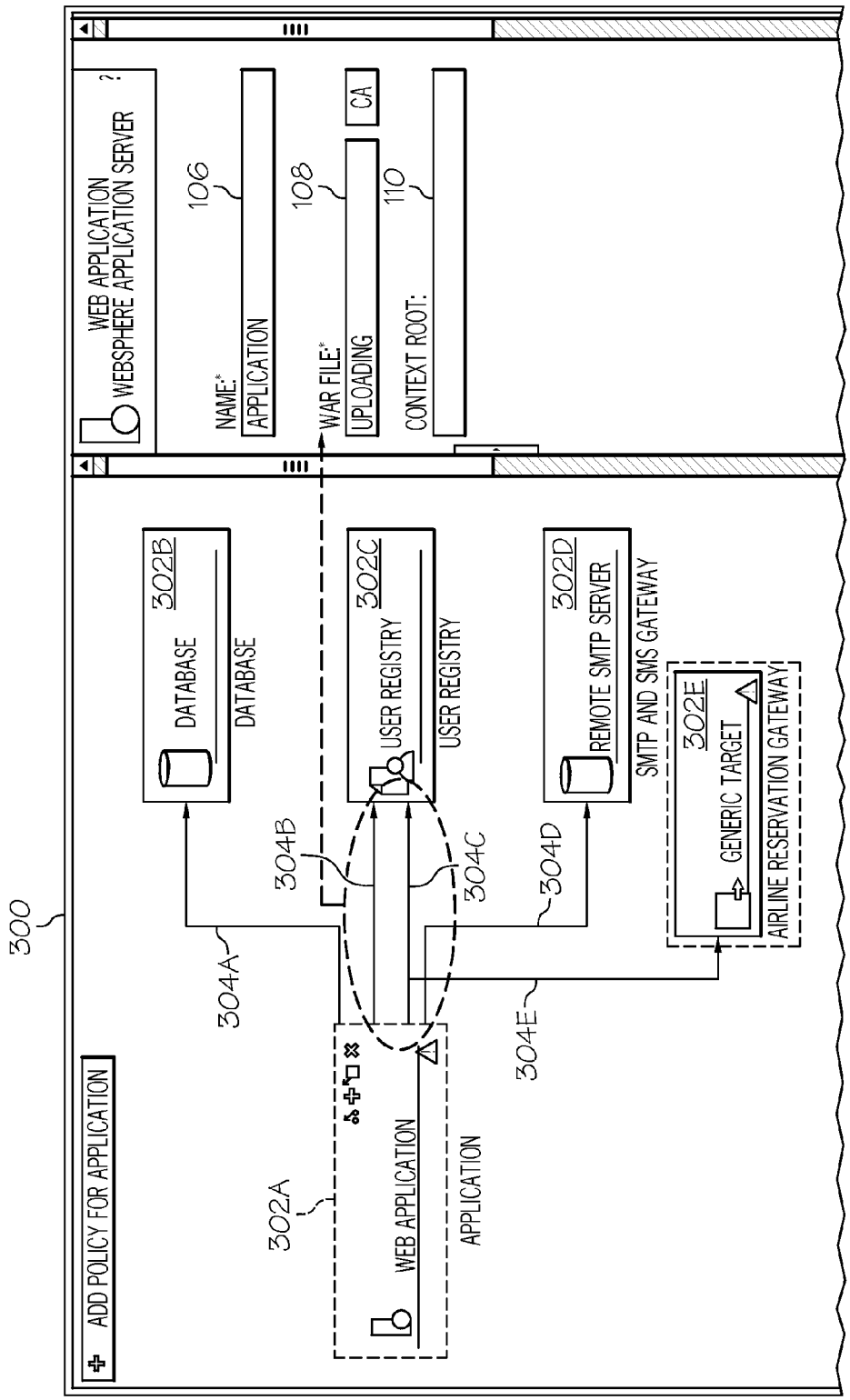
FIG. 8 depicts illustrative examples of an interrelationship attribute according to an embodiment of the present invention.
Figure 9:
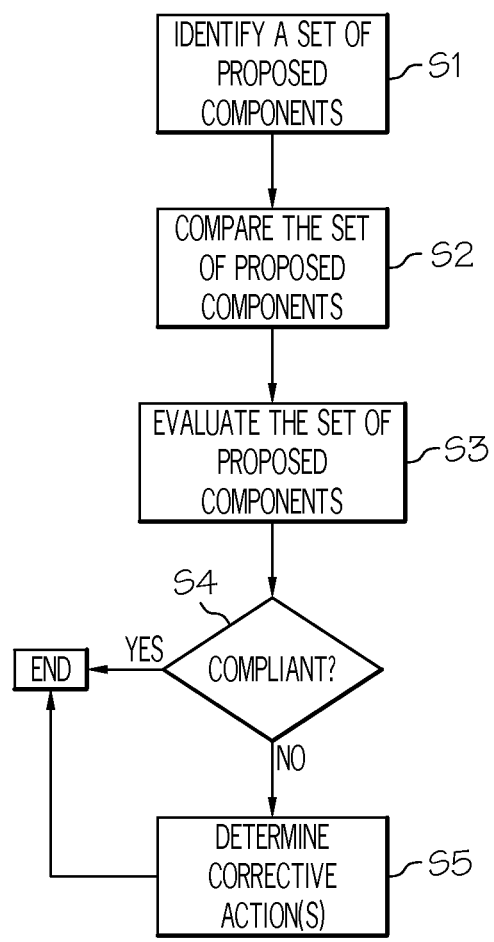
FIG. 9 depicts a method flow diagram according to an embodiment of the present invention.

Referring now to FIG. 8, an interface 300 that graphically depicts policy attributes is shown. As depicted, interface 300 graphically depicts components 302A-E. Interface 300 further shows interrelationships 304A-E (e.g., connections) between components 302A-E. This allows the addition or removal of any components to be graphically depicted and interrelated with any other components. In this example, component 302E has been added and connected to component 302A via interrelationship/interconnect 304E Referring now to FIG. 9, a method flow diagram according to an embodiment of the present invention is shown. In step S1, a set of proposed components of a proposed deployment pattern is identified for the networked computing environment. In step S2, the set of proposed components are compared to existing components of existing deployment patterns to identify a set of existing components that are similar to the set of proposed components. In step S3, the set of proposed components are evaluated for compliance with a set of policies. In step S4, it is determined whether all of the set of components are in compliance. If so, the process can end. If not, at least one corrective action can be determined (e.g., to address any compliance problems) in step S5.

While shown and described herein as a deployment pattern validation solution, it is understood that the invention further provides various alternative embodiments. For example, in one embodiment, the invention provides a computer-readable/useable medium that includes computer program code to enable a computer infrastructure to provide deployment pattern validation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide deployment pattern validation functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for deployment pattern validation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for validating deployment patterns in a networked computing environment, comprising:
   identifying a set of proposed components of a proposed deployment pattern for the networked computing environment;
   comparing the set of proposed components to existing components of existing deployment patterns to identify a set of existing components that are similar to the set of proposed components;
   evaluating the set of proposed components for compliance with a set of policies, the set of policies being stored in at least one computer storage device; and
   determining, responsive to at least one component of the set of proposed components lacking compliance with at least one policy of the set of policies, at least one corrective action to address the lack of compliance.

2. The computer-implemented method of claim 1, the identifying comprising:
   receiving the proposed deployment pattern; and
   analyzing the proposed deployment pattern to identify the set of proposed components.

3. The computer-implemented method of claim 2, the analyzing comprising:
   identifying a first proposed component;
   identifying at least one interrelationship connected to the first proposed component; and
   identifying at least one other proposed component based on the at least one interrelationship.

4. The computer-implemented method of claim 1, further comprising identifying the set of policies based on a type of the proposed deployment pattern.

5. The computer-implemented method of claim 1, the set of existing components being previously determined to be compliant with a set of corresponding policies.

6. The computer-implemented method of claim 1, the set of policies comprising at least one of the following: component attributes, policy attributes, or interrelationship attributes.

7. The computer-implemented method of claim 1, the networked computing environment comprising a cloud computing environment.

8. A system for validating deployment patterns in a networked computing environment, comprising:
a memory medium comprising instructions;
a bus coupled to the memory medium; and
a processor coupled to the bus that when executing the instructions causes the system to:
identify a set of proposed components of a proposed deployment pattern for the networked computing environment;
compare the set of proposed components to existing components of existing deployment patterns to identify a set of existing components that are similar to the set of proposed components;
evaluate the set of proposed components for compliance with a set of policies, the set of policies being stored in at least one computer storage device; and
determine, responsive to at least one component of the set of proposed components lacking compliance with at least one policy of the set of policies, at least one corrective action to address the lack of compliance.

9. The system of claim 8, the memory medium further comprising instructions for causing the system to:
receive the proposed deployment pattern; and
analyze the proposed deployment pattern to identify the set of proposed components.

10. The system of claim 9, the memory medium further comprising instructions for causing the system to:
identify a proposed deployment pattern proposed component;
identify at least one interrelationship connected to the proposed deployment pattern proposed component; and
identify at least one other proposed component based on the at least one interrelationship.

11. The system of claim 8, the memory medium further comprising instructions for causing the system to identify the set of policies based on a type of the proposed deployment pattern.

12. The system of claim 8, the set of existing components being previously determined to be compliant with a set of corresponding policies.

13. The system of claim 8, the set of policies comprising at least one of the following: component attributes, policy attributes, or interrelationship attributes.

14. The system of claim 8, the networked computing environment comprising a cloud computing environment.

15. A computer program product for validating deployment patterns in a networked computing environment, the computer program product comprising a computer readable storage device, and program instructions stored on the computer readable storage device, to:
identify a set of proposed components of a proposed deployment pattern for the networked computing environment;
compare the set of proposed components to existing components of existing deployment patterns to identify a set of existing components that are similar to the set of proposed components;
evaluate the set of proposed components for compliance with a set of policies, the set of policies being stored in at least one computer storage device; and
determine, responsive to at least one component of the set of proposed components lacking compliance with at least one policy of the set of policies, at least one corrective action to address the lack of compliance.

16. The computer program product of claim 15, the computer readable storage device further comprising instructions to:
receive the proposed deployment pattern; and
analyze the proposed deployment pattern to identify the set of proposed components.

17. The computer program product of claim 16, the computer readable storage device further comprising instructions to:
identify a first proposed component;
identify at least one interrelationship connected to the first proposed component; and
identify at least one other proposed component based on the at least one interrelationship.

18. The computer program product of claim 15, the computer readable storage device further comprising instructions to identify the set of policies based on a type of the proposed deployment pattern.

19. The computer program product of claim 15, the set of existing components being previously determined to be compliant with a set of corresponding policies.

20. The computer program product of claim 15, the set of policies comprising at least one of the following: component attributes, policy attributes, or interrelationship attributes.

21. The computer program product of claim 15, the networked computing environment comprising a cloud computing environment.

22. A method for deploying a system for validating deployment patterns in a networked computing environment, comprising:
providing a computer infrastructure being operable to:
identify a set of proposed components of a proposed deployment pattern for the networked computing environment;
compare the set of proposed components to existing components of existing deployment patterns to identify a set of existing components that are similar to the set of proposed components;
evaluate the set of proposed components for compliance with a set of policies, the set of policies being stored in at least one computer storage device; and
determine, responsive to at least one component of the set of proposed components lacking compliance with at least one policy of the set of policies, at least one corrective action to address the lack of compliance.

* * * * *